United States Patent
Lu et al.

(10) Patent No.: US 7,990,891 B2
(45) Date of Patent: Aug. 2, 2011

(54) METHOD FOR ORGANIZING A NETWORK OF COMMUNICATING OBJECTS AND COMMUNICATING OBJECT FOR THE IMPLEMENTATION OF THE METHOD

(75) Inventors: Jia-Liang Lu, Shanghai (CN); Michael Dohler, Barcelona (ES); Dominique Barthel, Bernin (FR); Fabrice Valois, Lyons (FR)

(73) Assignee: France Telecom, Paris (FR)

( * ) Notice: Subject to any disclaimer, the term of this patent is extended or adjusted under 35 U.S.C. 154(b) by 113 days.

(21) Appl. No.: 12/295,362

(22) PCT Filed: Mar. 29, 2007

(86) PCT No.: PCT/FR2007/051042
§ 371 (c)(1),
(2), (4) Date: Sep. 30, 2008

(87) PCT Pub. No.: WO2007/113442
PCT Pub. Date: Oct. 11, 2007

(65) Prior Publication Data
US 2009/0285126 A1    Nov. 19, 2009

(30) Foreign Application Priority Data
Mar. 31, 2006    (FR) ...................................... 06 51143

(51) Int. Cl.
*H04L 12/28* (2006.01)

(52) U.S. Cl. ....................................................... 370/254
(58) Field of Classification Search ........................ None
See application file for complete search history.

(56) References Cited

U.S. PATENT DOCUMENTS

| | | | |
|---|---|---|---|
| 2002/0044549 A1* | 4/2002 | Johansson et al. ............ | 370/386 |
| 2002/0045423 A1 | 4/2002 | Sashihara et al. | |
| 2003/0063655 A1* | 4/2003 | Young ........................... | 375/132 |
| 2003/0147386 A1* | 8/2003 | Zhang et al. .................. | 370/390 |
| 2005/0083859 A1* | 4/2005 | Kang ............................. | 370/254 |
| 2006/0221856 A1* | 10/2006 | Quiroz .......................... | 370/254 |

* cited by examiner

*Primary Examiner* — Chirag Shah
*Assistant Examiner* — Otis L Thompson, Jr.
(74) *Attorney, Agent, or Firm* — Drinker Biddle & Reath LLP

(57) ABSTRACT

A system and method organize a network of communicating objects in at least one partition comprising a plurality of communication cells respectively covered by a plurality of leader nodes, the network having a set of allocatable addresses split into a plurality of address pools distributively managed by the leader nodes. Upon a new node arrival, phase (a) and possibly phase (b) are executed. During phase (a), if the new node detects a leader node, it allocates an address from its managed address pool and the new node assumes a member node roll in the leader node cell. If the new node does not detect any leader node in its vicinity, it goes on to the phase (b), wherein, if the new node detects a first cell member node, it assumes the role of leader covering a second cell, obtains an available pool of managed addresses and is allocated one of the obtained addresses.

18 Claims, 3 Drawing Sheets

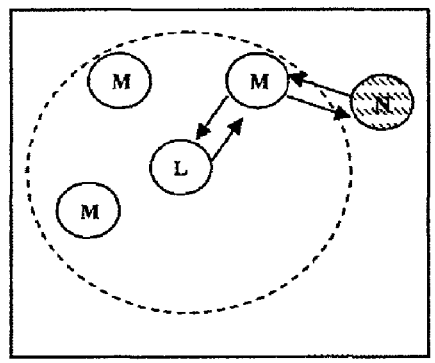
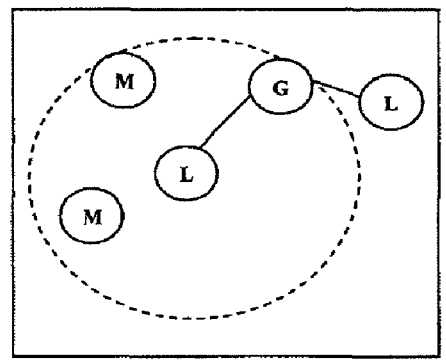
Figure 5A    Figure 5B
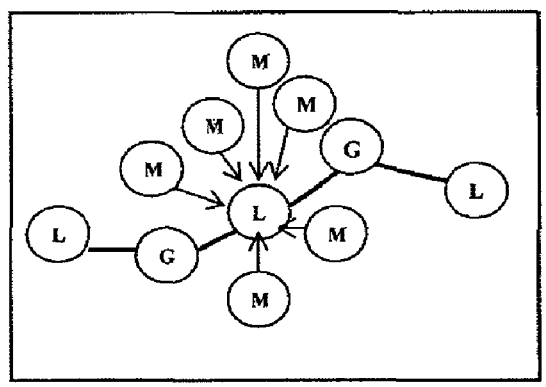
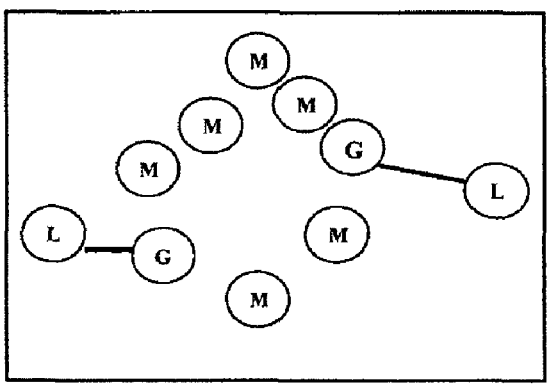
Figure 6A    Figure 6B
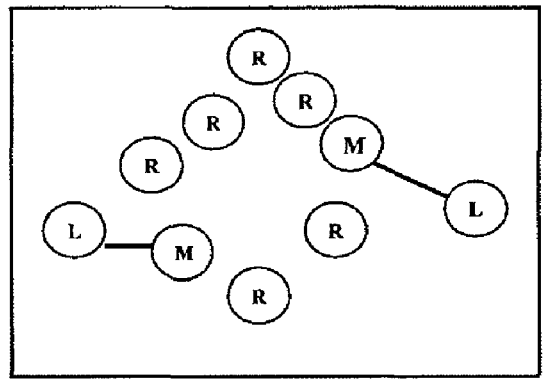
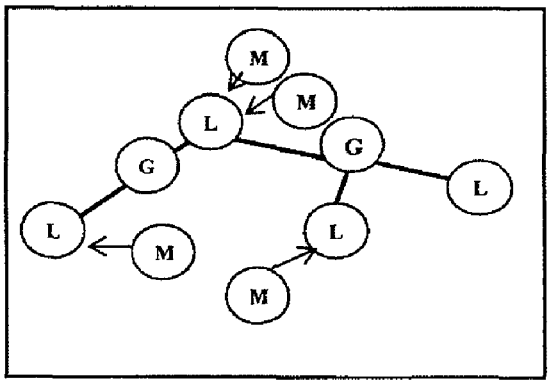
Figure 6C    Figure 6D

METHOD FOR ORGANIZING A NETWORK OF COMMUNICATING OBJECTS AND COMMUNICATING OBJECT FOR THE IMPLEMENTATION OF THE METHOD

CROSS-REFERENCE TO RELATED PATENT APPLICATIONS

This application is the U.S. national phase of the International Patent Application No. PCT/FR2007/051042 filed Mar. 29, 2007, which claims the benefit of French Application No. 06 51143 filed Mar. 31, 2006, the entire content of which is incorporated herein by reference.

BACKGROUND

The invention relates to a method for organizing a network of communicating objects.

A network of communicating objects may be formed by a plurality of communicating objects able to communicate with each other directly in an ad hoc manner, without passing through a base station or a centralized server, generally using inexpensive wireless communication technologies. They can be static communicating objects (office computer) or mobile communicating objects (laptop, PDA, sensor, cell phone, etc.).

Such a network can be created spontaneously and has no previously defined topology. Neither address servers nor routers are preconfigured for address allocation and message routing. After deployment, the network of objects is self-configured and self-organized dynamically, in a phase for putting into place communications. Non-limiting examples of such networks might include networks of sensors or even home networks.

The self-configuration of the network is aimed mainly at allocating addresses to the nodes of the network, whereas the self-organization is aimed at organizing the infrastructure of the network, at structuring it, by defining the respective roles of the various nodes of the network, in order to enhance the efficiency of the communications and to facilitate the implementation of the services. The prefix "self" refers to a process carried out by the nodes of the network themselves, without intervention from any source external to the network.

Self-configuration and self-organization are two separate mechanisms. Ordinarily, the self-configuration precedes the self-organization: when a network is formed, initially, the nodes implement a dynamic address allocation algorithm to configure their network interfaces then, secondly, they participate in a general organization of the network, more often than not based on the previously configured addresses. The address allocation mechanism must primarily guarantee the uniqueness of each of the node addresses in the network as a whole.

There are various approaches for allocating addresses in a network of communicating objects. One of these approaches, described in the documents P. Patchipulusu. *Dynamic address allocation protocols for mobile ad hoc networks. Master's thesis*, Texas A&M University, 2001, and Y. Sun and E. Belding-Royer. *Dynamic address configuration in mobile ad hoc networks. Technical Report*, University of California, June 2003, is based on leader nodes: one or more leader nodes of the network are responsible for allocating or registering addresses and ensure the uniqueness of the addresses throughout the network. Where there is a plurality of leader nodes, the latter synchronize, in a distributed way, the information on the allocated addresses and/or on the available addresses.

In an ad hoc network of communicating objects, the self-organization protocol must be implemented in a distributed way on the nodes. Each node takes a local decision after having collected local information. These local decisions culminate in a global organization having the desired properties.

There are, in particular, self-organization protocols based on the construction of "clusters", in other words, communication groups. In each group, a group leader is responsible for specific functionalities for all the communicating objects of the group. Generally, the elected group leader corresponds to the one having the lowest identifier, as is described in the document A. Ephremides, J. Wieselthier and D. Baker. *A design concept for reliable mobile radio networks with frequency hopping signalling. Proc of the IEEE*, 75(1):56-73, 1987. This type of self-organization protocol therefore requires the self-configuration to have been performed before all the nodes start electing the group leaders in the network.

Implementing the initial phase of self-configuration and of self-organization of a network of communicating objects entails the sending and receiving by the latter, more often than not by airwaves, of a large quantity of data. This is accompanied by a huge energy expenditure. As an illustration, some sensors use up as much as half of their battery in this initial phase. The critical point in the development of networks of communicating objects essentially lies in the energy longevity of the communicating objects. One of the pathways for growth of the networks of communicating objects consequently involves the development and use of self-configuration and self-organization mechanisms that use up less electricity, in order to increase the energy autonomy of the communicating objects, which is what the present invention provides.

SUMMARY

To this end, various embodiments of the invention relate to a method for organizing a network of communicating objects, into at least one partition comprising a plurality of communication cells respectively covered by a plurality of leader nodes able to communicate with each other, the network having a set of addresses to be allocated split into a plurality of pools of addresses intended to be managed in a distributed manner by the leader nodes of the network, a method in which, when a new node arrives in the network, the method comprises a phase (a) of leader node detection followed, where appropriate, by a phase (b) of member node detection, such that:

during the phase (a), if the new node detects a leader node in its vicinity, said leader node allocates it an address extracted from a pool of addresses that it manages and the new node takes the role of member node in the cell of the leader node, the messages originating from or addressed to a member node belonging to a given cell being intended to pass through the leader node covering said cell;

if the new node does not detect any leader node in its vicinity, it goes on to the phase (b), during the phase (b), if the new node detects a member node in its vicinity that belongs to a first cell, it takes the role of leader covering a second cell, obtains an available pool of addresses to be managed and allocates one of the addresses of said pool obtained.

The inventive method makes it possible to put in place a virtual network structure of communicating objects based on leader nodes, each having and managing at least one pool of addresses, and on member nodes attached to these leader nodes. Each new node arriving in the network discovers its vicinity, and then, according to its vicinity, locally determines its role and obtains an address.

The energy consumption of a node is thus greatly reduced in the self-configuration and self-organization phase: the node simply needs to detect whether a leader node is present in its vicinity, for example by observing the reception of a leader message regularly broadcast by the latter, and, in the case where the new node is not in the coverage area of a leader node, detecting whether a member node is present in the vicinity of the new node, to deduce therefrom both its address and its role (leader or member).

Advantageously, the self-configuration and self-organization are no longer two separate mechanisms, executed in succession, but are merged into a single mechanism: immediately a new node arrives in the network, it obtains both an address and a role (leader or member), in other words, it self-configures and self-organizes by executing a single mechanism. The self-configuration and self-organization operations are performed jointly, in other words, are merged into a single mechanism. When the new node arrives in the network, it exploits the knowledge of its vicinity to decide locally on its role (leader or member) in the structure and obtain its address according to its role and its location.

Advantageously, the member node detected by the new node in its vicinity during the phase (b) becomes a gateway node between the two leader nodes of the first and second neighboring cells, said leader nodes being intended to communicate with each other via the gateway node.

Thus, when a member node belonging to a first cell covered by a leader detects the arrival of a new leader node covering a second neighboring cell, it also assumes the role of gateway between the two leader nodes in order to handle the communication between these two leader nodes.

Also advantageously, if said new node detects neither leader node nor member node in its vicinity during the phases (a) and (b) respectively, the phase (b) is followed by a phase (c) during which the new node assigns itself a pool of addresses to be managed, assumes the role of the first leader node of a new network partition and assigns an identifier to said partition. Preferably, to determine the identifier of the new partition, said first leader node generates a number randomly. If the identifier of a partition is encoded on a sufficiently large number x, the risk of conflict between two respective identifiers of two separate partitions is negligible. The random generation of the numbers thus makes it possible to generate very easily different identifiers for the different partitions that are created, without it being necessary for a new partition to know the identifiers of the existing partitions.

In a particular embodiment, during the phase (a), the new node observes the reception of a message regularly broadcast by the leader nodes in order to detect the presence of a leader node in its vicinity, and, during the phase (b), the new node broadcasts to its vicinity a message invoking a member node and observes the reception of a member node announcement message. Thus, initially, a new object arriving in the network listens for a message broadcast regularly by the leader nodes then, secondly, if it does not receive such a leader message, it invokes a member node. Because of this, the energy expenditures of the existing nodes of the network and those of the nodes arriving in the network are greatly reduced.

The invention also relates to a communicating device able to integrate a network of communicating devices, comprising
a first functional mechanism able to handle a leader role covering a communication cell, a leader node being responsible for allocating addresses from a pool of addresses to the nodes located in its cell and for routing the messages originating from or addressed to member nodes belonging to its cell;
a second functional mechanism able to handle a member role in a cell covered by a leader node,
a first configuration mechanism, for implementing a phase (a) of leader node detection, arranged to
detect whether a leader node is present in the vicinity of the device, and,
if a nearby leader node is detected, obtain an address from said leader node and trigger the activation of the second functional mechanism,
a second configuration mechanism, for implementing a phase (b) of member node detection, arranged to
detect whether a member node is present in the vicinity of the device, and
if a nearby member node is detected, obtain a pool of addresses to be managed, be allocated an address from said pool and trigger the activation of the first functional mechanism,
the second configuration mechanism being intended to be implemented after the first configuration mechanism, in the case where the device has not detected the leader node in its vicinity.

The invention finally relates to a network of communicating devices comprising a plurality of devices as defined previously, forming at least one partition.

BRIEF DESCRIPTION OF THE DRAWINGS

The invention will be better understood from the following description of a particular embodiment of the method, of the node, and of the network of the invention, with reference to the appended drawings in which:

FIGS. 5A and 5B is a pictorial sequence diagram representing the arrival of a new leader node in the network;

FIGS. 6A to 6D is a pictorial sequence diagram representing the reconfiguration steps following the departure of a leader node.

DETAILED DESCRIPTION OF THE PREFERRED EMBODIMENTS

Figure 1:
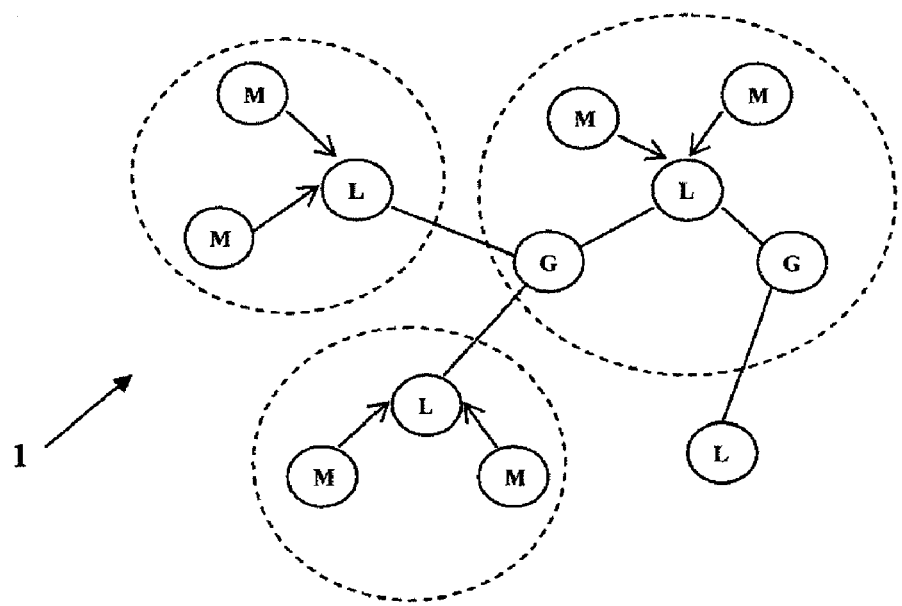
FIG. 1 is a pictorial diagram representing a network of communicating objects obtained according to an embodiment of the invention.

FIG. 1 shows a network 1 of communicating objects or devices, the organization of which results from the implementation of the inventive method. Right away, it will be noted that the terms "object", "device", and "node" are used interchangeably to denote the communicating objects of the network. In the particular example described, these communicating objects use radio communication mechanisms.

The network resulting from the implementation of various embodiments of the inventive method can comprise several "partitions" corresponding respectively to independent sub-networks, that is, sub-networks that are not interconnected with each other. The partitions can be merged by a change in the network, such as the movement of one or more nodes or the arrival of new nodes. A partition can also be required to be split into several partitions because of changes in the partition such as the departure of one or more nodes or even the movement of a node or a group of nodes. The operations for merging several partitions and splitting a partition will be explained below.

Figure 3:
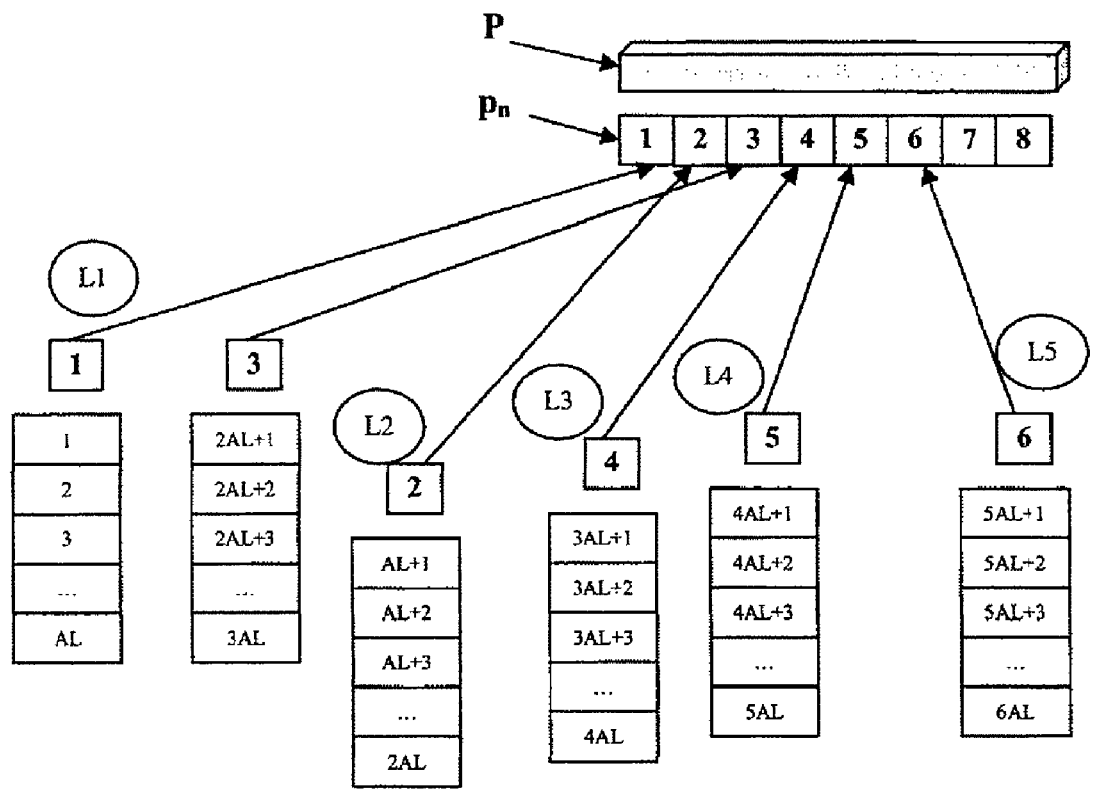
FIG. 3 is a block diagram representing the breakdown into pools of all of the addresses of the network and the assignment of a part of these pools to various leader nodes of the network.

Referring to FIG. 3, the network 1 has a set of network addresses P. In this case, this set P comprises a range of successive addresses, which is divided into a plurality of separate, successive sub-ranges. Hereinafter, these sub-ranges are herein called "pools of addresses" and are denoted $p_n$ (with $1 \leq n \leq 8$ in the particular example of FIG. 3). In the particular example described here, the pools of addresses are all of the same length, denoted AL, in other words, they all contain the same number AL of addresses. Furthermore, the pool numbered n, $p_n$, contains the following successive addresses: $(n-1).AL+1, (n-1).AL+2, \ldots, (n-1).AL+x, \ldots, n.AL$. As a variant, it would be possible to envisage dividing up the set of addresses of the network into pools of different lengths.

The organization put in place in the network 1 represented in FIG. 1 is based on "leader" nodes $L_i$, which cover respective communication cells, denoted $C_i$ (with $1 \leq i \leq 5$ in the particular example of FIG. 3), and on "member" nodes $M_{ij}$ belonging to the cells $C_i$. A cell $C_i$ associated with a leader node $L_i$ corresponds to the coverage area, or communication area, of this leader node $L_i$.

There are three possible roles for the nodes, or communicating objects, in this organization: leader, member and gateway.

A cell $C_i$ comprises a single leader node, denoted $L_i$, able to receive in its cell $C_i$ one or more neighboring nodes, members or gateways. By definition, in the particular example described here, a node is a neighbor to another node if the two nodes are separated by a single hop, in other words, if the two nodes can communicate directly with each other. It would be possible, in a variant, to consider that two nodes are neighbors when they are separated by a maximum of two, even more than two, hops. The role of the leader node $L_i$ is to take the lead in the address allocation and communication routing operations for the nodes belonging to its cell $C_i$, as will be explained below.

A leader node $L_i$ has several active roles in the organization. The first role of the leader node $L_i$ is to assign itself or to obtain one or more pools of addresses $p_n$ to be managed, and to manage this pool or these pools by allocating the addresses that are contained therein to itself and to the nodes incorporating its cell $C_i$. The leader nodes thus act as DHCP servers with respect to the new nodes arriving in the network. The different leader nodes of the network share the pools of addresses $p_n$, a pool of addresses being able to be granted to just one single leader node in a given partition. Because of this, the uniqueness of each of the addresses allocated is guaranteed within one and the same partition.

Moreover, when a new leader node is assigned a pool of addresses to be managed, it sends all the leader nodes of its partition a message to inform them of the use of this new pool of addresses. This message is delivered only to the leader nodes, which avoids a wide broadcasting of the information through all the nodes of the network.

A second role of the leader node $L_i$ is to route the incoming and outgoing communications of the other nodes of its cell $C_i$.

A third role of the leader node $L_i$ is to regularly broadcast a presence notification "broadcast" message LDBR (Leader Broadcast) containing the address of the leader node $L_i$, a partition identifier, and the number of leaders and the number of pools of addresses already granted in the partition. The term "broadcast" message should be understood to designate a message sent to all the nodes in the vicinity of the sending node, the broadcast message being processed by any node receiving it, unlike a "unicast" message which designates a message sent to a single node, the address of which is indicated in the header of the message as the destination address, the unicast message being processed solely by this node.

A fourth role of the leader node is to broadcast to all the leaders of its partition any update information, if it locally knows of a change in the network. The update information can relate in particular to the number of leaders of the partition and the number of pools of addresses already granted in the partition or even the identifier.

A member node is a neighboring node of a single leader node in the communication structure and whose incoming and outgoing communications are routed via this leader node. A member node has a passive role in the organization. It will be noted that a member node can be transformed into a gateway node so as to connect a new leader node to an existing leader node already in the network.

In a partition, the leader nodes are not directly connected to each other, but are connected via gateway nodes. A gateway node is therefore a neighboring node of at least two leader nodes, the role of which is to handle the communication between these two leader nodes. To this end, the gateway nodes have an active role in the organization. It will be noted that a gateway node between two leader nodes of one and the same partition is attached to just one of the two leader nodes that it links together, in other words, it belongs to the cell of one of the two leader nodes. A gateway node is therefore also a member node having an additional functionality for interconnecting two leaders, compared to the ordinary member nodes.

The assembly comprising the leader nodes, able to communicate with each other via gateway nodes and the member nodes (including gateways) belonging to the cells of these leader nodes, forms what is called a partition.

A function $f(n)$ for allocating addresses in a cell is implemented in all the nodes of the network, whatever their role. The function $f(n)$ is activated only on the leader nodes. The use of this function $f(n)$ enables a leader node $L_i$ to generate an available address in its cell, without address conflict with another address already allocated to a node of the cell $C_i$, from an entry corresponding to the last address allocation made by this leader node $L_i$. In the particular example described, the function $f(n)$ is such that: $f(n)=f(n-1)+1$. Thus, the function $f(n)$ begins by allocating the first address of a pool $p_i$ to the first node arriving in the cell $C_i$ and ends when all the addresses of the pool $p_i$ are used.

If, after using up all the addresses of the pool $p_i$, a new node arrives in the cell $C_i$, in other words within the coverage of the leader node $L_i$, a new pool of addresses $p_j$, available in the partition to which the node $L_i$ belongs, is granted to the leader node $L_i$. Update information concerning the pools of addresses used, indicating the total number of pools now used in the partition, is then broadcast to all the leader nodes of the partition. The range of addresses P is thus generated in a distributed way by the leader nodes alone. When a new pool of addresses is used by a leader node, all that is needed is to update the information on the total number of pools of addresses used with the leader nodes alone to avoid address conflicts in the partition.

In the case where a pool ceases to be used by a leader node, the latter sends a message to all the leader nodes of its partition to inform them of the fact that this pool has now become available again.

There now follows a description of the method for organizing a network of communicating objects such as the network 1 in a service area, according to a particular embodiment of the invention. The term "service area" should be understood to designate a predefined area in which the users want the network of communicating objects to provide a given service.

When a new node arrives in the network 1, the operations for allocating an address and integration in the structure of the network 1 are carried out in a maximum of three phases. In a first phase (a) of leader node detection, the new node observes, that is it awaits, the reception of a message LDBR (Leader Broadcast) notifying the presence of a leader node. If it receives it, it begins an address allocation procedure by communicating directly by unicast with the neighboring leader node and assumes the role of member node.

In a second phase (b) of member node detection, if no leader node is detected, the new node undertakes a discovery of its vicinity by broadcasting a message MBNS (Member Neighbor Solicitation) soliciting member nodes, to search for a member node (including gateway node) in its vicinity. If it receives an announcement message MBNA (Member Neighbor Advertisement) from a neighboring member node, it begins a procedure for allocating a pool of addresses by communicating with a leader node via the neighboring member node, and takes the role of new leader node.

In a third phase (c) of creating a new partition, if no neighboring node (leader, member or gateway) is detected, the new node allocates itself an address by using the function $f(n)$ and assumes the role of "first" leader node of a new partition. It also generates, randomly, a number forming a partition identifier intended to be inserted in the messages LDBR (Leader Broadcast) that will be broadcast regularly by itself and by all the future leader nodes of this new partition. Thus, a new partition appears in the service area.

There now follows a more detailed description of the protocols implemented in the following situations: creation of a partition, integration of a member node in an existing partition, integration of a leader node in an existing partition, departure of a node, division of a partition, and merging of partitions.

Creation of a Partition

Figure 2:
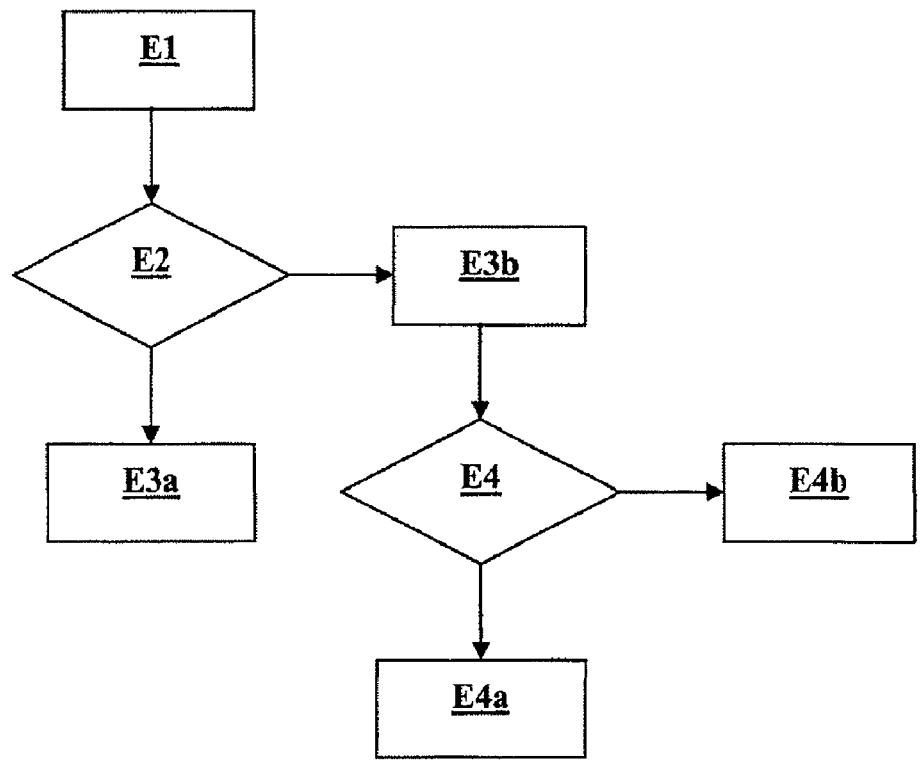
FIG. 2 is a flow diagram of various steps of the particular embodiment described of the inventive method.

Referring to FIG. 2, when a first communicating object N arrives in the network (step 1), during a phase (a) of leader node detection, it observes, in other words it awaits, the reception of a message LDBR broadcast by a leader node, at most until a predefined time limit LDBR_TIMEOUT expires (step 2). Since there is no leader node in the vicinity of the first object N, no message LDBR is received.

The phase (a) is then followed by a phase (b) of member node detection. During this phase (b), the object N broadcasts a message MBNS soliciting member nodes in the area covering its vicinity by a single hop (step 3b) and observes the reception of a message MBNA announcing member nodes, at most until the expiry of the predefined time limit MBNA_TIMEOUT (see step 4). Since the object N is alone in its coverage area, no message MBNA is received.

The phase (b) is then followed by a phase (c) for creation of a new partition. During this phase (c), the object N then assumes the role of first node of a new partition. In a step 4b, it assigns an identifier to its partition by generating a random number, determines a pool of addresses, allocates itself the first address of this pool and triggers the regular broadcasting of a message LDBR. In the particular example described here, the pool of addresses determined by the first leader of the partition is the first pool $p_1$ of the set of pools P.

Integration of a Member Node in an Existing Partition

Figures 4A, 4B:
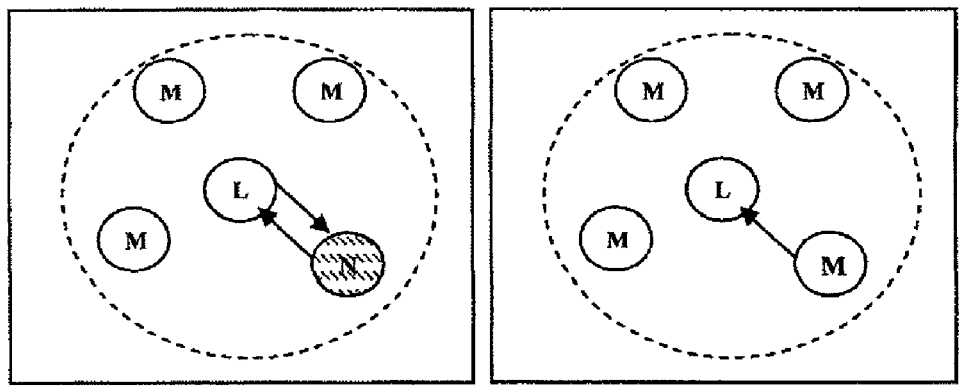
FIGS. 4A and 4B is a pictorial sequence diagram representing the arrival of a new member node in the network.

Referring to FIGS. 2, 4A and 4B, when a new communicating object N arrives in the network (step 1), during a phase (a) of leader detection, it observes the reception of a message LDBR broadcast by a leader node for a duration that cannot exceed the predefined time limit LDBR_TIMEOUT (step 2). If there is a leader node L in the vicinity of a hop from the new object N, the latter receives the message LDBR broadcast regularly by this leader node L. If the new object N receives several messages LBDR from several leader nodes belonging respectively to several partitions, it selects the leader node of the partition having the greatest number of leader nodes, given that the number of leaders of a partition is inserted into the message LDBR broadcast by each of the leader nodes of this partition.

The benefit of prioritizing the integration of a new object in the largest partition rather than in the smallest is that there is thus a higher probability for this new object of retaining its address after merging, as will emerge below in the description of a merge. If the new object N receives several messages LBDR from several leader nodes of the same partition, in this case it randomly selects one of the leader nodes.

As a variant, it would be possible to envisage a selection criterion based on the energy capacity of the leaders or on their identifiers. The new node N then begins with the selected leader node L to execute a single-hop direct address allocation procedure (step 3b), during which the two nodes L and N, neighbors by one hop, communicate directly with each other. During this allocation procedure, the new node N sends a unicast address request message MBAR (Member Address Request) to the selected leader node L. On receiving the message MBAR, the leader node L allocates an address to the new node N, using the function $f(n)$, and sends it a unicast message LDAA (Leader Address Allocation) for address allocation by a leader. On receiving the allocated address, the new object N assumes the role of member node M, associated with the leader node L, and configures its network interfaces by constructing a route to its leader node L so that all the outgoing messages from the member node M pass through the leader node L. The member node M sends a message MBAA (Member Address Acknowledgement) acknowledging a member address to its leader node L. The allocation procedure is then finished.

Integration of a Leader Node in the Network

Referring to FIGS. 2, 5A and 5B, if, during the phase (a), in the step E2, a new object N does not detect a leader node message LDBR, it considers that it is not covered by the cell of a leader node.

The phase (a) is then followed by a phase (b) of neighboring member node detection. In this phase (b), the new node undertakes the discovery of its vicinity. For this, it broadcasts a message MBNS soliciting member nodes in the area of its single-hop vicinity (see step E3(a), in broadcast mode, then observes the reception of a member node announcement message MBNA (step E4). A member node receiving a solicitation sends a message MBNA to notify its presence.

In the example described here, on expiry of the maximum predefined observation duration, denoted MBNA_TIMEOUT, the new object randomly selects a member node having responded to the solicitation MBNS by sending a presence message MBNA. The new object then begins with the selected member node M to execute a two-hop address allocation procedure, by sending the member node M a unicast member address request message MBAR.

The member node M then asks its leader node L to allocate a new pool of addresses, extracted from the range of addresses of the network. This new pool of addresses is sent by the leader node L to the new object N, in a leader address allocation message LDAA, via the member node M. The new object N then assumes the role of leader L', allocates itself the first address from the pool received and sends the leader node L a member address acknowledgement message MBAA via the member node M.

On receiving this message MBAA, the intermediate member node M assumes the role of gateway G between the two leader nodes L and L'. Each of the leader nodes L (L') adds to its own leader-gateway mapping table a new leader-gateway pair G-L' (G-L). Moreover, after having allocated a new pool of addresses to the leader node L', the leader node L sends all the leader nodes, via the gateways, of the partition, a message to update on all the leaders information relating to the use of the pools of addresses in the partition. In the particular example described, in which the pools of addresses are all of the same length, this information relating to the use of the pools contains the number of pools already allocated (or used) in the partition.

In the embodiment mentioned previously, in which pools of addresses can be of different lengths, instead of sending all the leaders the number of pools of addresses already allocated in the partition, the leader node L sends all the leader nodes of the partition the last address of the pool of addresses having been allocated to the leader node L'.

It would also be possible to envisage that the new leader node L' sends all the leaders of the partition the message to update the information on the use of the pools of addresses in the partition.

Departure of a Node

If a member node leaves the network, all the messages that are sent to it are lost, but this has no impact on the configuration and organization of the network. The associated leader node detects the absence of the member node having left the network and memorizes the address allocated to this member node so it can be reused.

If a gateway node G leaves the network, the leader nodes L and L' previously connected to this gateway node G asks their member nodes M, M' to enter into active LDBR message detection mode. The member nodes M, M' that receive the two LDBR messages respectively broadcast by the two leaders L and L' are then candidates for the role of new gateway. One of these candidates is selected to play the role of the new gateway between the leaders L and L'. The selection criteria can, for example, be the candidate node situated in the cell having the fewest member nodes.

If a leader node L leaves the network without warning, after a certain number of periods of a predefined duration without receiving an LDBR message, the member nodes M previously associated with this leader node L trigger a reconfiguration operation by discarding their addresses and repeating the steps of FIG. 2 until a new address is obtained and an a priori member or leader role is assumed. Each interconnecting gateway node G between the leader node L and a leader node L', previously managed by the node L, becomes a simple member node managed by the remaining leader node L'. Thus, the pool of addresses allocated to the leader node L then becomes available again for a new allocation. A gateway node having detected the absence of the leader L informs all the leader nodes of the partition of the fact that this pool has now become available again.

Division of the Partition

When a partition A splits into two partitions B and B', each of the two partitions B and B' likens this split to a departure of a group of nodes and acts if necessary to maintain a virtual communication structure. The leader nodes in the partition A retain their role of leader in their new partition B or B'. The member nodes take no initiative as long as they remain under the coverage of their leader node, that is, in the cell of the latter.

On the other hand, if a member node loses the link with its leader node, it triggers the operations for allocation of a new address and integration in a new partition B or B', comprising a phase (a) of neighboring leader node detection followed, if necessary, by a phase (b) of neighborhood discovery, itself followed, if necessary, by a phase (c) of creation of a new partition, as described previously. If a link between a leader-gateway pair is broken, the leaders previously connected to each other via this gateway execute the same actions as those, described previously, carried out in the event of departure of the gateway node.

Merging of Partitions

The dynamism of a group of nodes (due to the mobility, to the energy management mechanisms, etc.) forming a partition and the expansion of a partition are the two main reasons leading to the merging of two partitions. This merging is triggered by the prior detection, by at least one node, of two different partitions in its vicinity, these partitions being identified by their respective identifiers. It will be recalled here that the identifier of a partition, determined by the very first leader node of this partition, is a number, encoded on x bits, generated randomly. If the number x of bits on which the partition identifiers are encoded is large enough, the risk of conflict between two respective identifiers of two separate partitions is negligible, in as much as the number of partitions in a service area is far less than the total number of different identifiers that can be encoded on the x bits.

The detection of two partitions likely to merge is here handled by a new node N arriving in the network, during the phase (a) of leader node detection (steps E2 and E3b) referring to FIG. 2). Because it is handled by a newly arriving object, the detection of the two partitions does not require the radio senders/receivers of all the nodes of the network to be permanently maintained in active mode, which would represent a large energy expenditure for the network. Advantageously, the detection of two partitions here is energy efficient.

Hereinafter, the term "small" partition will be used to denote the one having the fewest leader nodes and the term "large" partition to mean the one having the largest number of leader nodes.

During the phase (a), the newly arriving node N therefore detects two leader nodes L1 and L2 belonging respectively to the large partition and to the small partition, by the reception of two LBDR messages containing two different identifiers ID1 and ID2. The new node N chooses the large partition to carry out the single-hop address allocation procedure with the leader node L1 detected in this large partition then becomes a member node attached to this leader node L1. Furthermore, the new node N assumes the role of gateway between the two partitions.

The new node N informs on the one hand, the leader nodes of the small partition, via the leader node L2, of the fact that merging is required, by sending a merge notification message MGNT, and on the other hand, the leader nodes of the large partition, via the leader node L1, of the fact that the number of pools of addresses used and the number of leaders in the partition resulting from the merge should be updated, by sending a leader address update message LDAU.

The leader node L1 of the large partition recovers the number of pools of addresses already allocated in the small partition via the newly arriving object N. It then calculates the total number of pools of addresses that will be needed after the merge and sends the leader address update message LDAU to the other leader nodes in the large partition in order to update the information on the number of pools of addresses used and the information on the number of leaders in the partition resulting from the merge.

The leader node L2 sends a merge notification message MGNT which is broadcast to all the leader nodes of the small partition. This merge notification here contains the number of pools of addresses used in the large partition. It will be recalled here that, in a partition, the pools of successive addresses are allocated one after the other, here in ascending order from the first pool $p_1$ of the range of addresses P, to the newly arriving leader nodes in the partition and to the leader nodes needing a new pool of addresses after having used up their preceding pool of addresses.

Consequently, on receiving a merge notification MGNT, the leader nodes of the small partition change pools of addresses by proceeding with a pool shift by a step equal to the total number of pools used in the large partition, in order to use pools that are not used by the large partition. The leader having in the small partition the pool numbered n, $p_n$, uses in the partition resulting from the merge the pool numbered N+n and allocates to itself the first address of this pool.

Thus, after the merge, the pools of addresses managed by the leader nodes of the small partition are those that follow the pools of addresses managed by the leader nodes of the large partition. In other words, if the highest pool in the large partition has the number N, then the pools of address allocated to the leaders of the small partition are the following pools numbered N+1, N+2, etc.

Once the leaders of the small partition have shifted their pools of addresses, they change certain parameters, such as the partition identifier and the total number of pools of addresses used in the partition (that is, the partition resulting from the merge), in the LDBR messages that they broadcast regularly.

On receiving the new partition identifier contained in the LBDR messages broadcast by the leader nodes, each member node (including the gateway nodes) of the small partition triggers the execution of a procedure for translating its address, similar to that carried out by the leader node, consisting in determining the address corresponding to its initial address in a pool of addresses offset by the number N of additional pools added by the large partition. The term "corresponding" address should be understood to designate the new address having the same position in the new pool as that of the preceding address in the old pool.

The member nodes determine their new address from their pre-merge address, from the information on the total number of pools used before the merge and from the information received in the new LDBR messages concerning the total number of pools used after the merge. From the number of pools used before the merge and from the number of pools used after the merge, each member node deduces therefrom the number of pools used by the large partition.

In the interests of clarity, take the example of a leader node $L_i$ of the small partition to which is allocated the pool of addresses numbered n, denoted $p_n$. After merging, the same leader node $L_i$ is responsible for the pool of addresses numbered N+n, N being the number of pools used in the large partition just before the merge. A member node $M_{i,j}$ of the small partition, located in the cell of the leader node $L_i$ and having in the pool $p_n$ the address having the position j, that is (n−1).AL+j, translates this address into an address that is offset after the merge [(n−1)+N].AL+j. This translation procedure guarantees the uniqueness of the addresses after the merge.

In a particular embodiment, a node can decide at any time to change role, in order in particular to reduce its energy consumption. Thus, a leader or gateway node can allow a member node to assume its role. Advantageously, the energy expenditures of the nodes can be distributed more fairly over the various nodes of the network over time.

The communicating objects/devices able to incorporate the network 1 of communicating objects each comprise all the mechanisms needed to implement the various mechanisms and protocols that have just been described, only the necessary mechanisms being activated to handle the role assumed by the object in the virtual structure. In particular, each object comprises:
  a first functional module able to handle a leader role covering a communication cell,
  a second functional module able to handle a member role in a cell covered by a leader node,
  a third functional module able to perform the role of a gateway for the communication between two leader nodes.

These three functional modules, leader, member and gateway, are arranged to implement the actions described previously with reference to the leader nodes, member nodes and the gateway nodes.

Each object/device also comprises:
  a first configuration module, for implementing the phase (a) of leader node detection as described previously, notably arranged to
    detect whether a leader node is present in the vicinity of the object, and,
    if a neighboring leader node is detected, obtain an address from said leader node and trigger the activation of the second functional mechanisms;
  a second configuration module, for implementing a phase (b) of member node detection as described previously, notably arranged to
    detect whether a member node is present in the vicinity of the object, and
    if a neighboring member node is detected, obtain a pool of addresses to be managed, allocate itself an address from said pool and trigger the activation of the first functional module.

The second configuration module is intended to be activated after the first configuration module, in the case where the object has not detected any leader node in its vicinity.

The object also comprises a third configuration module, for implementing the phase (c) for establishing a partition described previously, arranged to, if the object detects neither leader node nor member node in its vicinity, assign itself a pool of addresses to be managed, assume the role of the first leader node of a new network partition and assign an identifier to said partition. This third configuration module is intended to be activated after the first and second configuration modules, in the case where the object has detected neither leader node nor member node in its vicinity.

Finally, the object comprises a control module arranged to control the activation and the operation of the functional modules and of the configuration modules.

The invention claimed is:

1. A method for organizing a network of communicating objects into at least one partition comprising a plurality of communication cells respectively covered by a plurality of leader nodes able to communicate with each other, the network having a set of addresses to be allocated split into a plurality of pools of addresses to be managed in a distributed manner by the leader nodes of the network, the method comprising:

when a new node arrives in the network:
  detecting a leader node in a phase (a); and
  detecting, if a criteria is met, a member node in a phase (b);
wherein:
during the phase (a),
  allocating by the leader node, if the new node detects a leader node in its vicinity, an address to the new node extracted from a pool of addresses that the leader node manages; and
  taking, by the new node, a role of member node in the cell of the leader node;
  wherein the leader node covering the cell is configured to pass through the messages originating from or addressed to a member node belonging to a given cell;
wherein the criteria for detecting the member node is if the new node does not detect any leader node in its vicinity, the phase (b) comprising, if the new node detects a member node in its vicinity that belongs to a first cell, then:
  taking by the new node the role of leader covering a second cell,
  obtaining an available pool of addresses to be managed; and
  allocating one of the addresses of the obtained pool.

2. The method as claimed in claim 1, wherein the member node detected by the new node in its vicinity during the phase (b) becomes a gateway node between the two leader nodes of the first and second neighboring cells, the leader communicating with each other via the gateway node.

3. The method as claimed in claim 1, wherein:
if the new node detects neither leader node nor member node in its vicinity during the phases (a) and (b), the method further comprising phase (c) that follows phase (b), the phase (c) comprising:
  assigning a pool of addresses to be managed by the new node to itself;
  assuming the role of the first leader node of a new network partition; and
  assigning an identifier to the new network partition.

4. The method as claimed in claim 3, wherein, in order to determine the identifier of the new partition, the first leader node generates a number randomly.

5. The method as claimed in claim 1, further comprising, during the phase (a), observing by the new node a reception of a message regularly broadcast by the leader nodes in order to detect a presence of a leader node in its vicinity.

6. The method as claimed in claim 1, further comprising, during the phase (b):
  broadcasting by the new node to its vicinity a message invoking a member node and;
  observing a reception of a member node announcement message.

7. The method as claimed claim 1, wherein, during the phase (b), obtaining the pool of addresses to be managed comprises:
  transmitting by the new node an address request to the leader node covering the first cell via the neighboring member node detected in the first cell; and
  in response, notifying by the leader node of the first cell the new node of a pool of addresses to be managed via the member node.

8. The method as claimed in claim 1, further comprising, during the phase (b):
  transmitting, by one of the two leader nodes respectively covering the first and second cells, to the other leader nodes of the partition a message to inform them of the use of a new pool of addresses by the new leader node covering the second cell.

9. The method as claimed in claim 1, further comprising:
  splitting a set of network addresses into a succession of separate pools of addresses and each pool comprising a range of successive addresses;
  assigning the pools of successive addresses in a given order to the leader nodes successively incorporating the partition; and,
  allocating, in a cell, the successive addresses of the pool managed by the leader node of said cell in a given order to the nodes successively incorporating the cell.

10. The method as claimed in claim 1, wherein, when the network comprises at least two partitions that are independent of each other but likely to be merged, the method further comprising:
  performing a detecting of the two partitions by a new node arriving in the network during the phase (a) by detecting two neighboring leader nodes belonging to two different partitions.

11. The method as claimed in claim 10, further comprising: merging the two partitions, by:
  changing pools of addresses by the leader nodes of a first of the two partitions by proceeding with a pool shift by a step equal to a total number of pools used in the second of the two partitions, in order to use pools that are not used by the second partition;
  broadcasting in their respective cells a message containing information on a total number of pools used after the merge; and
  determining, by the member nodes of the first partition, their new address from their premerge address and the number of pools of addresses used by the second partition.

12. The method as claimed in claim 11, further comprising:
sending a merge notification message to the leader nodes of the first partition to trigger a change of the addresses in the first partition; and
sending an update message containing information relating to the pools of addresses used in the post-merge partition and information on the number of leaders of the post-merge partition to the leader nodes of the second partition.

13. The method as claimed in claim 3, further comprising:
reconfiguring, after a leader node leaves the network, the member nodes belonging to the cell of said leader node by implementing the phase (a) followed, where appropriate, by the phase (b), which is in turn followed, where appropriate, by the phase (c).

14. The method as claimed in claim 1, further comprising:
asking, after a gateway node between two leader nodes leaves, by the two leader nodes, the member nodes belonging to their respective cells to enter into active mode for detecting messages regularly broadcast by the two leader nodes.

15. A communicating device arranged to integrate a network of communicating devices, comprising:
  a first functional mechanism arranged to handle a leader role covering a communication cell, a leader node being responsible for allocating addresses from a pool of addresses to the nodes located in its cell and for routing the messages originating from or addressed to member nodes belonging to its cell;
  a second functional mechanism arranged to handle a member role in a cell covered by a leader node, a first configuration mechanism, for implementing a phase (a) of leader node detection, arranged to:
  detect whether a leader node is present in the vicinity of the device; and,
  if a neighboring leader node is detected, obtain an address from said leader node and trigger the activation of the second functional mechanism; and
a second configuration mechanism, for implementing a phase (b) of member node detection, arranged to:
  if the device has not detected any leader node in its vicinity in the activation of the first configuration mechanism, then:
  detect whether a member node is present in the vicinity of the device; and
  if a neighboring member node is detected, take by the device a role of leader covering a second cell, obtain a pool of addresses to be managed, allocate itself an address from said pool and trigger the activation of the first functional mechanism.

16. The device as claimed in claim 15, further comprising:
a third functional mechanism arranged to perform a role of a gateway for the communication between two leader nodes, that is activated in the case where, the device being in the cell covered by a first leader node, it detects in its vicinity a new node arriving in the network and assuming the role of leader.

17. The device as claimed in claim 15, comprising:
a third configuration mechanism for implementing a phase (c) for establishing a partition, arranged to, if the device detects neither leader node nor member node in its vicinity, assign itself a pool of addresses to be managed, assume the role of the first leader node of a new network partition and assign an identifier to said partition.

18. A network of communicating devices comprising a plurality of devices as claimed in claim 15 forming at least one partition.

* * * * *